United States Patent [19]

Ohtaki et al.

[11] 4,034,387

[45] July 5, 1977

[54] APPARATUS FOR TAKING PHOTOGRAPHS OF AN OBJECT IN CLOSE PROXIMITY BY MEANS OF FLASH

[75] Inventors: Shohei Ohtaki, Machida; Susumu Kozuki, Kawasaki; Zenzo Nakamura, Urawa, all of Japan

[73] Assignee: Canon Kabushiki Kaisha, Tokyo, Japan

[22] Filed: Apr. 16, 1974

[21] Appl. No.: 461,420

Related U.S. Application Data

[63] Continuation of Ser. No. 390,712, Aug. 23, 1973, abandoned.

[30] Foreign Application Priority Data

Aug. 28, 1972  Japan .............................. 47-86064

[52] U.S. Cl. .................... 354/126; 354/139; 354/149
[51] Int. Cl.² ...................................... G03B 15/02
[58] Field of Search ........... 354/35, 126, 139, 149; 240/1.3

[56] References Cited

UNITED STATES PATENTS

| | | | |
|---|---|---|---|
| 2,596,376 | 5/1952 | De Goeij | 240/1.3 X |
| 2,682,603 | 6/1954 | Dine et al. | 240/1.3 |
| 3,198,097 | 8/1965 | Hine | 354/126 |
| 3,382,786 | 5/1968 | Weidner | 354/149 |
| 3,638,543 | 2/1972 | Kondo | 354/35 |
| 3,646,865 | 3/1972 | Biber | 354/139 |
| 3,650,189 | 3/1972 | Biber | 354/139 |

Primary Examiner—R. L. Moses
Attorney, Agent, or Firm—Toren, McGeady and Stanger

[57] ABSTRACT

The present invention refers to an apparatus for taking photographs of an object in close proximity by means of a flash. A proper exposure is obtained for the object in close proximity with the use of flash equipment with variable illumination intensity, in accordance with the equation $$F \cdot L = \frac{1}{1+M} \cdot a \cdot \sqrt{N \cdot Pe}$$

L: Distance to the object
M: Photographic magnification
a: Constant
N: Film sensitivity
Pe: Effective lighting quantity
F: Aperture of diaphragm The flash equipment is designed in such a manner that the flash light part of the flash equipment can nearly be brought in alignment with the optical axis of the objective of the photographic camera while the illumination intensity of the flash light can be varied.

14 Claims, 5 Drawing Figures

APPARATUS FOR TAKING PHOTOGRAPHS OF AN OBJECT IN CLOSE PROXIMITY BY MEANS OF FLASH

This is a continuation of application Ser. No. 390,712 filed Aug. 23, 1973 now abondoned.

BACKGROUND OF THE INVENTION

1. Field of the Invention

The present invention refers to an apparatus for taking photographs of an object in close proximity by means of a flash, especially an electronic flash.

2. Description of the Prior Art

Until now, when a photograph is taken by means of an electronic flash which gives an auxiliary illumination or flash light to the object, the adjustment is carried out in such a manner that the total light quantity peculiar to the electronic flash, i.e. the so-called guide number for ASA 100 corresponds to the product of the distance between the photographic camera and the object and of the aperture value of the diaphragm whereby the aperture of the diaphragm is variable. When photographing objects in close proximity, the distance between the photographic camera and the object is so small that then proper exposure can not be obtained unless the aperture value should be adjusted below the lowest value adjustable on the diaphragm of the photographic camera. Accordingly it is impossible to take a photograph in close proximity in this way. Under such circumstances, the photograph is taken in such a manner that the light quantity of the electronic flash is reduced, the electronic flash being not directed to the object.

However, in the above mentioned way, it has been very difficult to always obtain a constant and proper exposure, because the proper exposure must be obtained only with great experience of the photographer or only after repeated trials and errors.

Further until now, when an electronic flash is used as the light for taking a photograph in close proximity, it has been impossible to obtain uniform flash light, because the light distributing character of the electronic flash plays an important role for providing light to the object when the distance between the optical axis of the objectives of the photographic camera and the electronic flash becomes smaller in the direction of the object. Thus, as one of the counter-measures that has been carried out to provide light to the object in close proximity by means of an electronic flash consisting of a ring-shaped Xenon tube and being mounted on the objectives of the photographic camera. Nevertheless, even with such electronic flash, the above mentioned problems can not be solved. Moreover, when the object is in closer proximity, the object itself is provided with ring-shaped light by means of the light provided by the ring-shaped Xenon tube in such a manner that the center of the object is provided with less light. This can be considered another weak point.

SUMMARY OF THE PRESENT INVENTION

The purpose of the present invention is to avoid the above mentioned weak point, by offering a method to take a photograph of the proximity of an object and in close proximity to the camera by means of which method a proper exposure can always be obtained.

A further purpose of the present invention is to offer a flash equipment with which a proper exposure can always be obtained covering an ordinary distance as well as a very small distance.

The further purpose of the present invention will be explained in detail according to the drawings.

BRIEF EXPLANATION OF THE PREFERRED EMBODIMENT

The fundamental principle of the present invention will be explained below.

Figure 1:
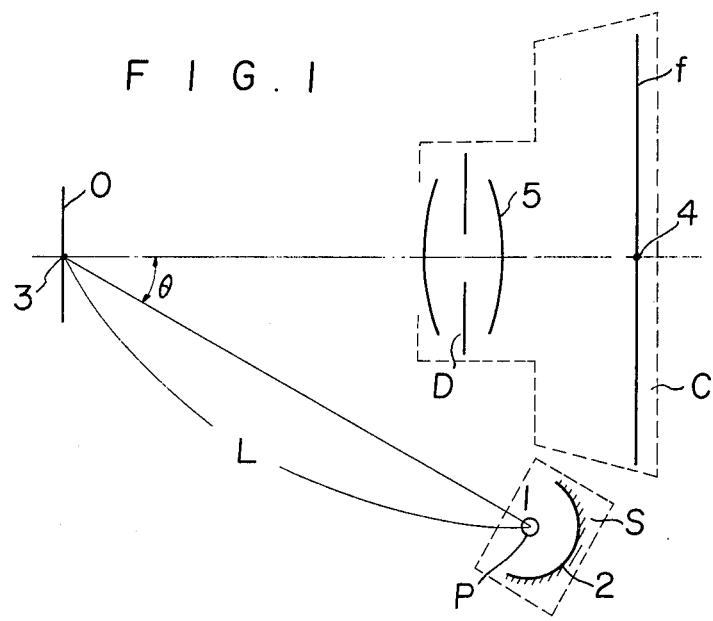
FIG. 1 shows a disposition of the provision of light by means of an electronic flash.

FIG. 1 shows in a schematical way a disposition of the provision of light by means of an electronic flash, whereby 1 is a light-providing body of the light source of for example electronic flash, 2 a reflector having a parabolic surface, 3 the center of the object O, 4 the center of the film surface $f$ inside of the photographic camera C, 5 the objectives and D the diaphragm.

The electronic flash is usually so arranged as to be inclined by an angle $\theta$ to the optical axis of the photographic camera C in such a manner that the center 3 of the object O is lighted.

The brightness E(O) at the center 3 of the object along the direction of the optical axis of the photographic camera is given by the following equation (1)

$$E(O) = [RP/L^2] \cos\theta \qquad (1)$$

whereby

P (Beam Candle Power Second) is the flash output of the lightening source 1,

R the reflecting effect of the reflector 2 and

L the distance between the lightening source 1 and the center 3 of the object O.

The brightness B(O) at the center 3 of the object O along the direction of the optical axis is given by the following equation (2)

$$B(O) = E(O) \, r/t \qquad (2)$$

whereby r is the scattering reflecting factor of the object O.

The intensity of illumination I(O) at the center 4 of the film surface is given by the following equation (3)

$$I(O) = \frac{N}{4} \cdot t \cdot B(O) \cdot \frac{1}{F^2 (1 + M)^2} \qquad (3)$$

whereby

B is the brightness of the object O

F the aperture value of the photographic camera C

N the sensitivity of the film $f$ t the permeability of the photographic lens C and M the magnification factor The conditions substantial to the proper exposure is generally given by the following equation (4)

$$B \cdot T = K \cdot F2/N \qquad (4)$$

whereby
T is the exposure time and
K a constant

Because in many cases the left term of the equation (4) can be considered to be essentially equal to the brightness exposed at taking a photograph, the then exposure condition (5) is derived from the equations (1) – (3) as follows.

$$F \cdot L = \frac{1}{M+1} \cdot \sqrt{\frac{N \cdot R \cdot P \cdot r}{t \, K} \cos\theta} \qquad (5)$$

whereby the sensitivity $N$ of the film, the constant $K$ and the factor $r$ can be given to the equation (5) in advance, while at least one of the aperture value $F$, the distance $L$, the factor $R$, the flash output $P$ and the angle $\theta$ must be corrected according to the magnification factor $M$ in order to obtain a proper exposure.

In case a photograph is taken at the ordinary distance instead of in close proximity by means of electronic flash, the variation of R, $\theta$ and the magnification M can be neglected and $\theta$, R and M can be considered to be substantially constant.

Under such circumstances the conditions to take photograph of the object at the ordinary distance can be given by the following equation $$F \cdot L = a \sqrt{N \cdot P} \qquad (6)$$

whereby $a$ is a constant.

Figure 2:
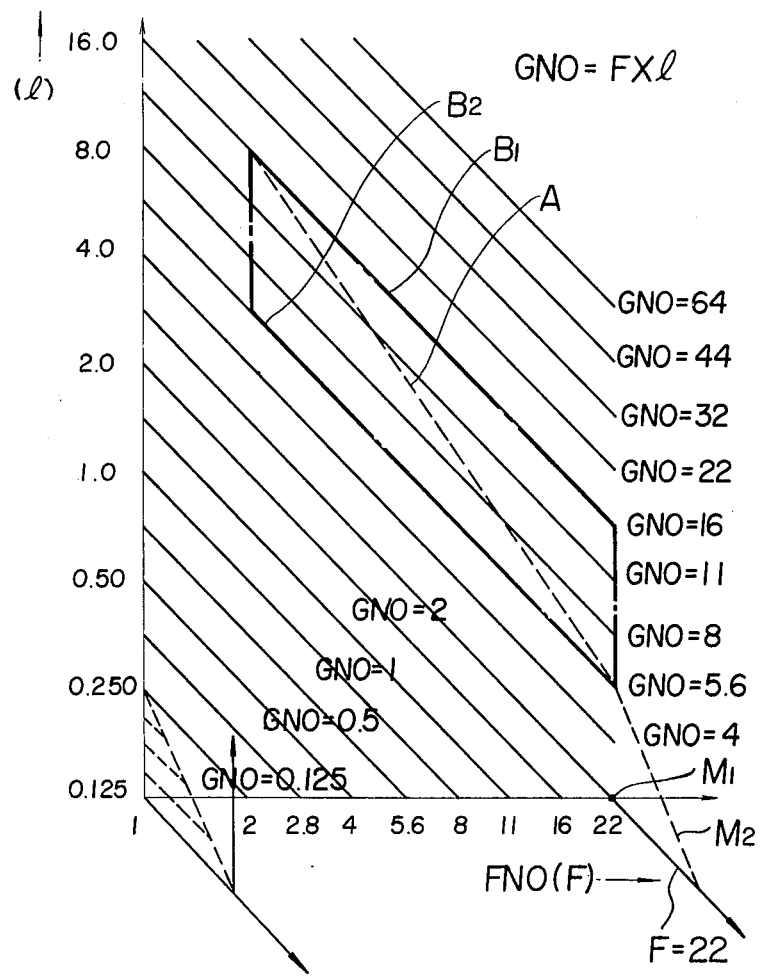
FIG. 2 shows an operational character of the method according to the present invention.

The right term of the equation (6) is usually called as guide number and used to determine the aperture value when taking photograph of the object at the ordinary distance. This relation is shown in FIG. 2 in a schematical way. It is understood from FIG. 2 that when an electronic flash with guide number 16 is used as an auxiliary lightening source with a photographic camera which is equipped with aperture means adjustable between F2 – F22, the aperture value is to be adjusted to the distance to the object according to the characteristics curve, as is clear from the equation (6).

In other words it is possible to obtain a proper exposure for an object between the distance 0.75m as the nearest one and the distance 8m as the farthest one. However the lighting value of the guide number 16 is too large to obtain a proper exposure when a photograph is taken of an object at further smaller distance.

From the equation (6) it is understood that the lightening quantity P of the electronic flash must further be reduced when a photograph is to be taken of an object at further smaller distance. When for example the guide number is reduced down to 5, 6, the distance to an object in which a proper exposure can be obtained can be reduced down to the nearest distance up to 0.25m, as is shown by the characteristics curve $B_2$ of FIG. 2.

In other words by making the guide number of the electronic flash variable, it is possible to enlarge the distance to an object in which a proper exposure can be obtained, over the range covering 8 – 0.250m, as is shown in the characteristics curve A of FIG. 2.

However in view of the fact that it must be subject to the supposition that the distance L to an object in the equation (6) should be an ordinary one that the nearest distance to an object in which a proper exposure can be obtained can be enlarged by reducing the lighting quantity P of the electronic flash, it becomes clear that the every condition for taking photographs should be decided according to the equation (5) when the distance L to an object becomes further smaller.

Because the magnification factor M gives a large influence when a photography of an object in close proximity is taken, at least one of the aperture value F, the distance L, the factor R, the flash output P and the angle $\theta$ is to be, as mentioned already, corrected according to the magnification factor M. This distance, or range, to the object in which the exposure is not correct due to photographic magnification at the time of flash photographing also can be termed the near range distance. Further in case the lighting quantity of an electronic flash is reduced, the lighting characteristics of the lighting tube is further varied, which correction is all the more complicated in such a manner that the practice is theoretically extremely difficult.

According to the present invention the lightening direction is brought into alignment with the optical axis of the objectives of the photographic camera and further the lighting quantity is made variable so that the proper exposure can be obtained with extremely high accuracy in taking a photograph of an object in close proximity.

Below, the principle of the present invention will be explained according to the theoretical equation. When the lightening angle $\theta$ of an electronic flash is brought in alignment with the optical axis ($\theta = O$), the effective flash output $Pe$ of the electronic flash is defined with the equation $Pe = RP \cos\theta = RP$, so that the above mentioned equation (5) can substantially be written in the following equation (7).

$$F \cdot L = \frac{1}{1+M} \cdot a \cdot \sqrt{N \cdot Pe} \qquad (7)$$

As is clear from the equation (7) it is practical to adjust the effective lightening quantity Pe according to the distance L and magnification factor M as the value of F is constant (the smaller value) in order that a proper exposure can be obtained in case a photograph is taken of an object in close proximity. The adjustment of the value Pe is carried out by making the lightening quantity P and further the reflecting factor R variable according to the necessity.

Thus the flash light quantity P is either discontinuously varied or adjusted on a certain determined lightening quantity P in such a manner that a proper exposure can be obtained only for an object in close proximity for example in the neighborhood of 0.125m or continuously varied in such a manner that a proper exposure can be obtained for an object in a distance covering from 0.250 to 0.125m, when it is switched to take a photograph of an object at an ordinary distance over in close proximity.

As mentioned above the right term of the equation (7) is determined by considering only the magnification factor M and the above mentioned constant a flash light quantity is changed. Supposing that the value obtained be for example 4, a proper exposure is obtained at the point $M_1$ of FIG. 2 i.e. in the neighborhood of 0.125m, in case the lighting quantity P is discontinuously varied and the angle $\theta$ is varied in such a manner that the flash light tube is directed to the center of the object in case the photograph is taken of the object in close proximity. In case on the other hand the lightening quantity P is continuously varied in accordance with the distance of the object, the proper exposure can be obtained continuously for the object to be photographed in close proximity, as shown with the characteristics curve $M_2$.

As is clear from the above explanation and FIG. 2, the purpose of the present invention is to offer a photographic equippment with which continuous photographing conditions can be continuously obtained, as shown in program, characteristics $A_1$, $B_1$ or $B_2$ for an object at an ordinary distance, in close proximity or in a very close proximity. What is most important and essential about the above mentioned quantity P is that the flash light quantity P should be varied in such a manner that such equations as (7) be satisfied, i.e. under consideration of the magnification factor M.

Below the present invention is explained according to the drawings of the embodiment according to the present invention.

Figure 3:
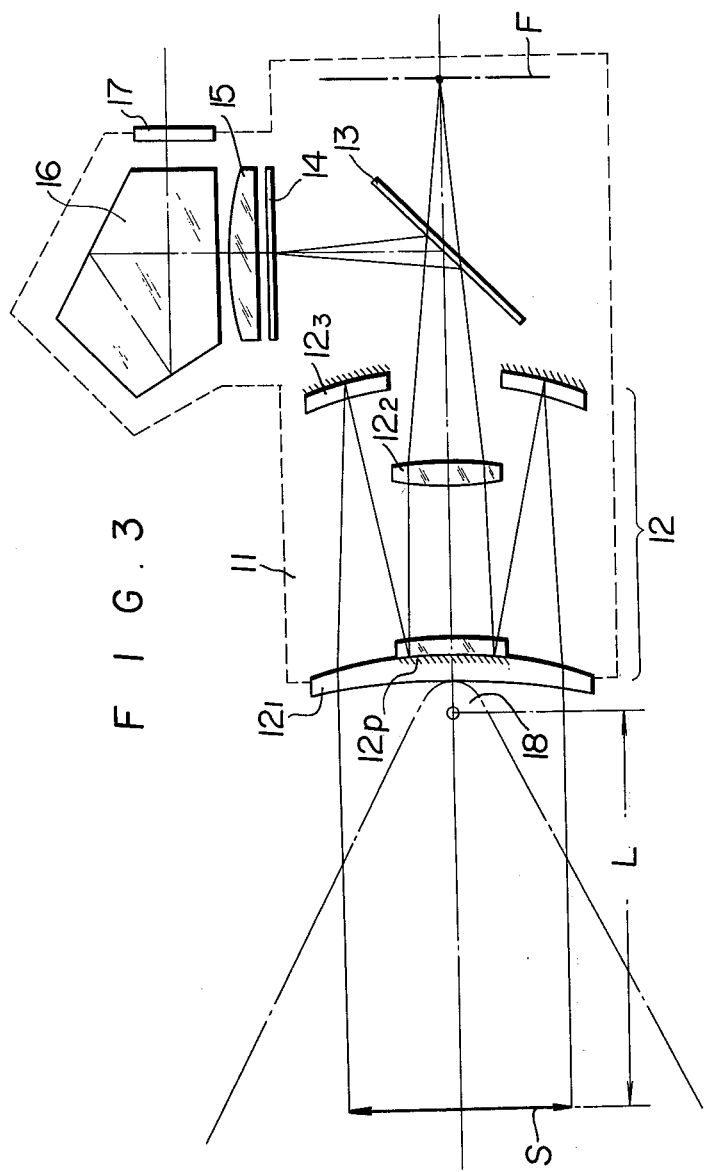
FIG. 3 shows a disposition of the photographic camera with which the provision of light method according to the present invention is carried out.
Figure 4:
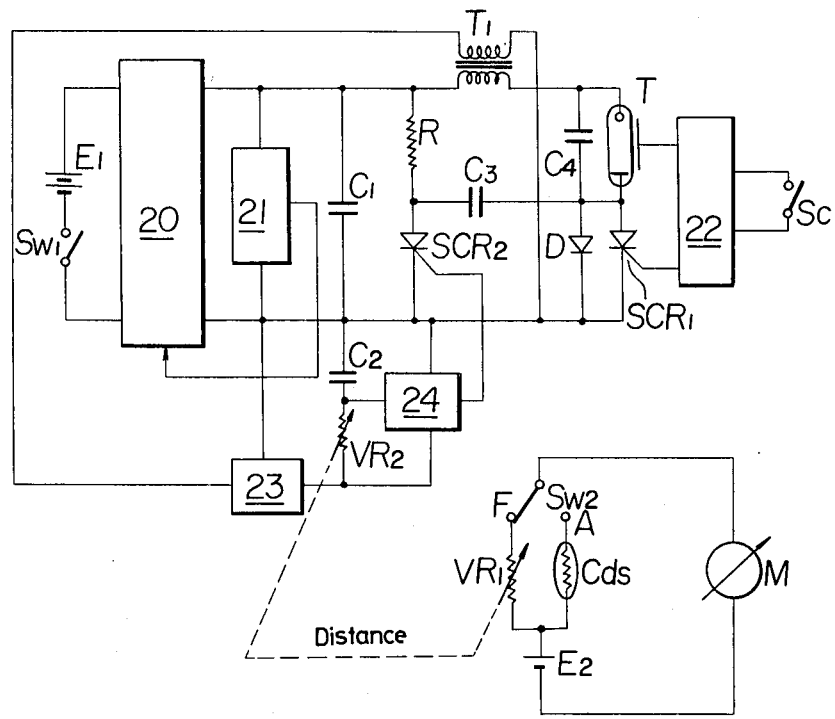
FIG. 4 shows an electric circuit of the photographic camera shown in FIG. 3.

11 is the photographic camera with which the method according to the present invention, 12 the optics composed of optical members consisting of $12_1$, $12_2$ and $12_3$. $12_1$ is an objective, one part 12P of which is formed as a reflecting surface, $12_2$ a convex lens disposed so as to be opposed to the opening of a concave reflector $12_3$. 13 is a half-mirror, 14 a focussing glass, 15 a condensor lens, 16 a pentaprism, 17 an eye-piece, whereby 13–17 represent the view-finder-optics system of the already known single-reflex camera. F is the film, 18 the electronic flash mounted at the center of the objective lens $12_1$. The flash light equipment 18 is situated on the reflecting surface 12P in the middle of the objective lens in such a manner that its flash light tube is situated in alignment with the optical axis of the optics 12. S is an object especially placed in close proximity. FIG. 4 shows that circuit of the electronic flash shown in FIG. 3 and that of the exposure meter of the photographic camera, whereby 20 the already known voltage step up circuit, $E_1$, $Sw_1$, respectively the switch for battery and that for electrical source connected with the input of the voltage step up circuit. 21 is the already known constant voltage control circuit which serves to keep the output voltage of the voltage step up circuit 20 almost at a constant value. $C_1$ is the main capacitor, $R_1$ and $SCR_2$ respectively the resistance and thyristor for the lightening suspending circuit connected in parallel with the capacitor $C_1$, $T_1$ the transformer to detect the flash lighting current, $C_2$ the condensor for reversing current, T the Xenon tube, $SCR_1$ the thyristor for trigger, 22 the trigger circuit, $S_c$ the synchronizing switch to synchronize the release of the photographic camera 11, 23 the rectifying circuit to rectify the output of the transformer $T_1$, $C_2$ and $VR_2$ respectively the condensor and the variable resistance composing a time constant circuit to control the lightening time, 24 the switching circuit. The circuit for the exposure meter of the photographic camera 11 consists of the meter M, the battery $E_2$, the light receiving elements CdS to measure the brightness of the object and the variable resistance which is switched over by the switch $S_{w2}$.

Figure 5:
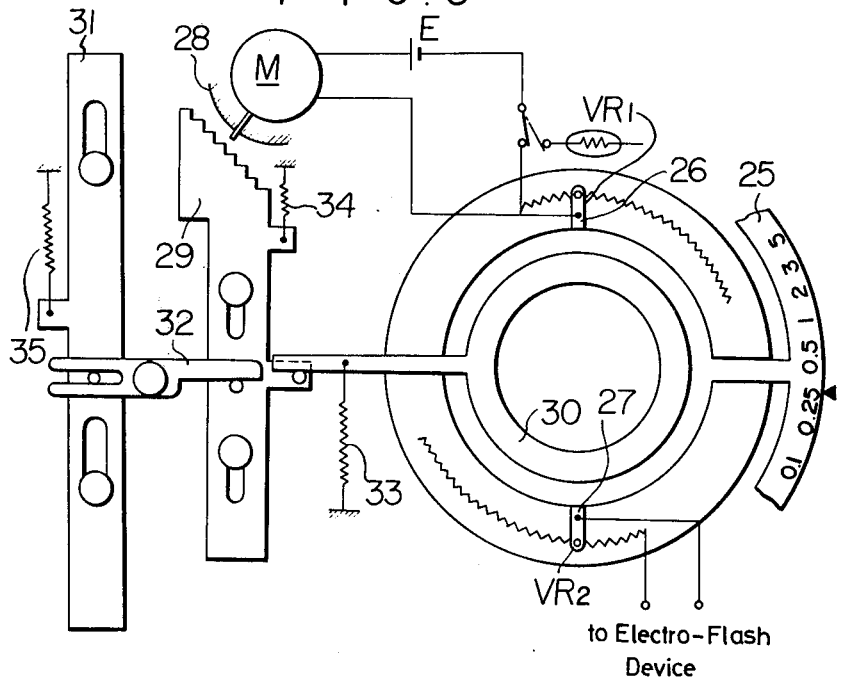
FIG. 5 shows the element of the photographic camera shown in FIG. 3.

The variable resistances $VR_1$ and $VR_2$ consist of the slider elements 26 and 27 which is moved by the distance setting ring 25 of the optics 12 as is shown in FIG. 5. Further the already known automatic flash mechanism is applied in which the position of the cam plate 29 is determined by the position of the finger 28 in such a manner that the aperture of the aperture ring 30 in functional connection with the cam plate is adjusted. 31 is the release means, 32 the connecting means, 33 – 35 the resetting springs.

When a photograph is taken of an object in close proximity with the photographic camera 11, the switch $S_{w1}$ and $S_{w2}$ are respectively switched over to on and F side and the distance setting ring 25 of the photographic lens is rotated in such a manner that the focussing of the object in close proximity is obtained. By doing this the value of the variable resistances $VR_1$ and $VR_2$ is set in accordance with the distance of the object. By this setting the time constant of the time constant circuit consisting of the variable resistance $VR_2$ and the condensor $C_2$ is set to a certain determined time constant with which the lightening quantity P of the Xenon tube satisfies the equation (7). Then the release means 31 is pushed down against the strength of the resetting spring 35 in such a manner that the cam plate 29 is moved by means of the spring through the connecting means until the finger 28 of the meter M touches the cam plate 29. Because the strength of the spring 34 is larger than that of the spring 35, the aperture ring 30 is rotated in accordance with the movement of the cam plate 29 in such a manner that the aperture value is set in accordance with the set distance of the object. This aperture value F is given only by the variable resistance $VR_1$ and is not the value as is given by the equation (6) without consideration of the magnification factor M. After the above operation the release operating members 31 is further pushed down in such a manner that the shutter is released and the synchronizing switch $S_c$ is closed. Then the $ScR_1$ is brought into a conductive state and the Xenon tube T begins to lighten. When with the lightening of the Xenon tube the lightening current is detected by the transformer T, the detected current charges the condensor $C_2$ through the rectifying circuit 23 and the variable resistance $VR_2$. When the condensor $C_2$ is charged after lightening of the Xenon tube, because the variable resistance $VR_2$ is set in functional connection with the variable resistance $VR_1$, the $ScR_2$ is brought into the conductive state and by this the $ScR_1$ is brought into the non conductive state by the discharge of the condensor $C_3$ and the Xenon tube T is put out.

Because the Xenon tube T begins to lighten with the shutter release and puts out after a certain determined time in accordance with the distance of the object, the lightening quantity of the Xenon tube is adjusted in accordance with the distance of the object.

The characteristic of the variable resistance $VR_2$ is designed in such a manner that the lightening time is adjusted so that the lightening quantity P under consideration of the distance of the object is obtained when the distance of the object is varied in consideration of the equation (7).

As mentioned above according to the present invention it has become possible to avoid an uneven distribution of the light on an object especially in proximity, i.e. the uneven distribution of the light due to the difference of the light scattering characteristics by bringing the optical axis of the dielectric flash in alignment with that of the photographic lens of the camera in such a manner that a very effective photographic method can be offered. 9n

What is claimed:

1. Flash equipment for illuminating objects for a camera having an objective lens with an optical axis, comprising:
   a. flash means for illuminating an object with flash light having a direction coincident with a central optical axis of the objective lens, said flash means being mounted along said axes;
   b. circuit means connected to said flash means for energizing said flash means; and
   c. control means for regulating flash duration of said flash means in correspondence to photographic magnification.

2. Flash equipment for illuminating objects for a camera having shutter blades and that has a diaphragm for varying the aperture diameter to some predetermined minimum and an optical system with an optical axis, comprising a flash illuminating means mounted in alignment with the optical axis in order to illuminate the object, circuit means for connection to said flash illuminating means in order to energize said illuminating means, switch means for selectively connecting said circuit means to said flash illuminating means, control means for regulating the duration of said flash illuminating means energization according to the distance between the objects and the camera, and means for coupling the camera aperture diaphragm and said control means together to establish a setting according to the distance between the object and the camera in order to vary the aperture diameter in accordance with the distance to the object until the aperture diameter reaches the predetermined minimum aperture diameter and in which said means for coupling the camera aperture diaphragm and said control means includes a time constant circuit having a first variable resistance and a condensor, whereby the first variable resistance is varied in accordance with the distance setting for varying the time constant and for setting the flash duration.

3. Flash equipment for illuminating objects for a camera having shutter blades and that has a diaphragm for varying the aperture diameter to some predetermined minimum and an optical system with an optical axis, comprising a flash illuminating means mounted in alignment with the optical axis in order to illuminate the object, circuit means for connection to said flash illuminating means in order to energize said illuminating means, switch means for selectively connecting said circuit means to said flash illuminating means, control means for regulating the duration of said flash illuminating means energization according to distance between the object and the camera, and means for coupling the camera aperture diaphragm and said control means together to establish a setting according to the distance between the object and the camera in order to vary the aperture diameter in accordance with the distance to the object until the aperture diameter reaches the predetermined minimum aperture diameter and in which said means for coupling the camera aperture diaphragm and said control means has an aperture control circuit being equipped with a variable resistance to be varied in functional connection with the distance setting and an aperture indication meter, whereby the aperture is set according to the indication of said aperture indication meter.

4. An equipment according to claim 2 in which said means for coupling the camera aperture diaphragm and said control means has an aperture control circuit being equipped with a econd variable resistance to be varied in functional connection with the distance setting, an aperture indication meter having a following finger means in functional connection with the position indicated of the finger of said aperture indication meter, whereby the shutter blades of the camera are connected functionally with said following finger means in such a manner that the aperture is set.

5. An equipment according to claim 4 including a distance setting mechanism and in which said first and second variable resistances are varied in functional connection and physically located at the distance setting mechanism.

6. An equipment according to claim 2 in which said means for coupling is functionally connected with said first variable resistance so as to satisfy the equation $$F \cdot L = \left(\frac{1}{1+M}\right) \cdot a \cdot \sqrt{N \cdot Pe}$$

wherein,
   $L$: Distance to the object
   $M$: Photographic magnification
   $a$. Constant
   $N$. Film sensitivity
   $Pe$: Effective lightening quantity
   $F$: Aperture of diaphragm
in such a manner that the operation time of said control means is set so as to vary the illuminating quantity of said flash illuminating means.

7. Flash equipment, for illuminating objects for a camera having a diaphragm for varying the aperture diameter to a predetermined minimum and an optical system with an optical axis, comprising:
   a. flash means for illuminating an object with flash light having a direction coincident with a central optical axis of the optical system of the camera, said flash means being mounted along said axis;
   b. circuit means connected to said flash means for energizing said flash means;
   c. control means for regulating flash duration of said flash means in correspondence to photographic magnification; and
   d. a second control means for varying the aperture diameter in accordance with the distance to the object until the aperture diameter reaches the predetermined minimum aperture diameter.

8. Flash equipment for illuminating objects for a camera having a diaphragm for varying the aperture diameter to a predetermined minimum and an optical system with an optical axis, comprising:
   a. flash means for illuminating an object with flash light having a direction coincident with a central optical axis of the optical system of the camera;
   b. circuit means connected to said flash means for energizing said flash means;
   c. control means for regulating flash duration of said flash means in correspondence to photographic magnification; and
   d. a second control means for varying the aperture diameter in accordance with the distance to the object until the aperture diameter reaches the predetermined minimum aperture diameter and wherein said second control means comprises a first means for producing a first signal corresponding to a distance between the object and the camera and an aperture control means for controlling the diaphragm in correspondence with the first signal.

9. Flash equipment according to claim 8, wherein said first means includes a variable resistor.

10. Flash equipment according to claim 9, wherein said aperture control means includes an aperture indication meter connected to said variable resistor.

11. Flash equipment for illuminating objects for a camera having a diaphragm for varying the aperture diameter to some predetermined minimum and an optical system with an optical axis, comprising:
 a. a flash illuminating means mounted in alignment with the optical axis in order to illuminate the object;
 b. circuit means for connection to said flash illuminating means in order to energize said flash illuminating means;
 c. control means for regulating the duration of said flash illuminating means energization according to the distance between the object and the camera;
 d. means for coupling the camera aperture diaphragm and said control means together to establish a setting according to the distance between the object and the camera in order to vary the aperture diameter in accordance with the distance to the object until the aperture diameter reaches the predetermined minimum aperture diameter, and in which said means for coupling the camera aperture diaphragm and said control means has an aperture control circuit, said aperture control circuit having a first variable resistor to be varied in functional connection with the distance setting and an aperture indication meter, whereby the aperture is set according to the indication of said aperture indication meter.

12. Flash equipment according to claim 11, said means for coupling the camera aperture diaphragm and said control means further comprising:
 a. a finger scanning means for scanning the position indicated of the finger of said aperture indication meter; and
 b. connection means associated with the finger scanning means, said connection means controlling the camera aperture diaphragm according to the output of said finger scanning means.

13. Flash equipment according to claim 11, wherein said control means includes a second variable resistor having a resistance corresponding to distance between the object and the camera, whereby the duration of said flash illuminating means energization is regulated in response to the adjusted resistance of said second variable resistor.

14. A combination of a camera and a flash device which comprises:
 a. a diaphragm for varying the aperture diameter to some predetermined minimum;
 b. an objective lens with an optical axis;
 c. a reflecting surface formed on one part of said objective lens;
 d. a reflector having an opening formed in optical alignment with said reflecting surface;
 e. a further lens interposed between said reflecting surfaceand said reflector in optical alignment with said reflecting surface and said reflector opening;
 f. a flash means spaced from said objective lens and in optical alignment with said reflecting surface, said further lens and said reflector opening;
 g. circuit means connected to said flash means for supplying said flash means with a light energy;
 h. control means for regulating the duration of said flash means energization according to distance between the object and the camera; and
 i. means for coupling the camera aperture diaphragm and said control means together to establish a setting according to the distance between the object and the camera in order to vary the aperture diameter in accordance with the distance to the object until the aperture diameter reaches the predetermined minimum aperture diameter.

* * * * *